United States Patent [19]

Larsen et al.

[11] Patent Number: 4,691,794

[45] Date of Patent: Sep. 8, 1987

[54] WEIGHT SCALES AND STRAIN GAUGE ASSEMBLIES USEABLE THEREIN

[75] Inventors: Larry D. Larsen, Elgin, Ill.; Richard C. S. Yung; Wing K. Leung, both of Hong Kong, Hong Kong; Joseph E. Hogel, Algonquin, Ill.

[73] Assignee: Fyrnetics, Inc., Elgin, Ill.

[21] Appl. No.: 689,377

[22] PCT Filed: Oct. 19, 1983

[86] PCT No.: PCT/US83/01617

§ 371 Date: Sep. 4, 1984

§ 102(e) Date: Sep. 4, 1984

[87] PCT Pub. No.: WO85/01796

PCT Pub. Date: Apr. 25, 1985

[51] Int. Cl.$^4$ .................. G01G 3/14; G01G 21/24
[52] U.S. Cl. ....................... 177/211; 177/255; 177/DIG. 9
[58] Field of Search ............... 177/177, 180, 211, 244, 177/255, DIG. 9; 73/862.65, 862.66

[56] References Cited

U.S. PATENT DOCUMENTS

| | | | |
|---|---|---|---|
| 2,321,585 | 6/1943 | Cummings | 177/244 X |
| 2,899,191 | 8/1959 | Hunt | 177/211 |
| 4,225,002 | 9/1980 | Soderholm | 177/255 |
| 4,281,727 | 8/1981 | Meeks | 177/177 X |
| 4,411,327 | 10/1983 | Lockery et al. | 177/DIG. 9 |
| 4,457,385 | 7/1984 | Provi | 177/211 |
| 4,483,404 | 11/1984 | Weihs | 177/DIG. 9 |
| 4,580,645 | 4/1986 | Shoberg | 177/211 |
| 4,581,948 | 4/1986 | Reichow | 177/211 X |

*Primary Examiner*—George H. Miller, Jr.
*Attorney, Agent, or Firm*—James W. Potthast

[57] ABSTRACT

A strain gauge assembly of the type having an elongate flexible member (12) with attached strain gauges (36, 38) has forces applied thereto at points (48, 50) spaced from its central neutral plane (52) by means including members mounted to a foot (10) and force receiving (14) members for non-sliding lateral movement relative thereto. In another embodiment strain gauges are attached to a flexible diaphragm (68) which is in communication with a fluid contained within a flexible sealed container (78) that is restrained against lateral movement by a hollow restraint member (62) therearound but which has a portion (80) protruding from a lower open end (66) thereof to receive a load to pressurize the fluid for flexing the diaphragm (68). A weight scale suitable for employment of the above strain gauge assemblies has an electronic adder (91) summing the loads of a plurality of strain gauge assemblies (92) or load modules to produce a total load signal which is applied to an electronic display (90) for provision of a visual indication of weight.

62 Claims, 13 Drawing Figures

WEIGHT SCALES AND STRAIN GAUGE ASSEMBLIES USEABLE THEREIN

BACKGROUND OF THE INVENTION

This invention generally relates to weight scales and, more particularly, to electronic weight scales and strain gauge assemblies used therein.

Electronic weight scales are well known which employ strain gauges that are attached to a flexible member. Compression or stretching of the strain gauge during flexing of the member causes it to produce a voltage which is related to the load, or weight, causing the member to flex. This voltage is then amplified and applied to an LED or other suitable display for visually indicating the weight placed on the scale.

In particular, it is known to employ an elongate flexible, cantilevered beam which is tightly secured to a rigid frame at one end and which receives a load intermediate the secured end and its distal end that causes it to flex and thereby energize a strain gauge attached thereto. In order to prevent excessive flexing, it is often necessary to provide the flexible, cantilevered beam with a substantial thickness which prevents incorporating it in a scale of desirable low profile. Customarily, the load is applied to the beam at a single fixed point spaced a substantial relative distance from the fixed end which defines a single movement arm. The precise length of this movement arm is critical for accurate measurement but is difficult to achieve. In addition, non-linearity in the relationship between the load and amount of resultant flexing is caused by the flexing. As the beam flexes more, an increasing large component of the load force becomes directed along the length of the beam instead of transverse to the beam. Further, since the force is applied to only one point on the beam, uniform distribution of the load to this one point is difficult to achieve.

An electronic scale is known which alleviates some of these problems but which has other disadvantages. In this electronic scale, the ends of an elongate flexible member with a strain gauge are torqued, or rotated, in opposite direction to cause the intermediate portion of an elongate flexible member to flex downwardly in response to a load. The ends pass through slots through intermediate portions of elongate, load distribution arms which are caused to twist about their elongate axis in response to a load. These arms are supported on one side by knife edge supports and receive loads at their other sides through knife edge load transmission members to cause them to twist and thus apply a torque to the ends of the flexible member at the edges of the slots.

This approach may enable a lower profile than the cantilevered structure noted above and achieves a certain degree of load distribution by virtue of the spaced, elongate arms. However, position of the flexible member relative to the edges of the slots in the arms is not fixed and non-linearities are still introduced. Such non-linearities are introduced in part because of high friction sliding movement between the arms and the flexible member which resist flexing to an increasing degree with increasing loads. In addition, the flexing of the member causes apparent foreshortening between the load points which introduces further non-linearities.

A further problem with known weight scales is that only the scale housing protectively encloses the relatively fragile strain gauges. Accordingly, the strain gauges are relatively unprotected prior to assembly or during repair when the housing is removed. In addition, known scales are constructed in a way which does not facilitate substantial sub-assembly of modular units and the cost reducing advantages resultant therefrom.

SUMMARY OF THE INVENTION

It is therefore a principal object of the present invention to provide weight scales and strain gauge assemblies which solve or alleviate the problems and disadvantages of known electronic scales and strain gauge assemblies.

In keeping with this objective, a weight scale having a housing and a display responsive to a strain gauge signal for visually indicating weight measured by the scale is provided with an improved strain gauge assembly comprising a flexible member with a strain gauge attached thereto to provide an electrical signal in response to the flexing of the flexible member, a foot member in underlying relationship with the flexible member, a load receiving member in overlying relationship with the flexible member, a pair of support members connected with the foot member for supporting the flexible member at a pair of spaced locations associated therewith, and a pair of load transmitting members connected with the load receiving member for transmitting a load therefrom to the flexible member at two locations spaced from one another and from the pair of locations associated with the foot member.

In a preferred embodiment, a strain gauge assembly is provided comprising a foot member, a load receiving member, a flexible member with a strain gauge attached thereto and means for interconnecting the flexible member with the foot member and the load receiving member including an interconnecting member mounted between the flexible member and at least one of the foot member and the load receiving member for movement relative thereto.

Preferably, an interconnecting support member is mounted to the foot member for rocking movement relative thereto and an interconnecting force transmitting member is mounted to the force receiving member for rocking movement. This rocking movement substantially reduces the amount of frictional force resisting the movement of the flexible member relative to sliding movement. Accordingly, the movement is smoother and more responsive to the flexing of the flexible member. This reduces non-linearity otherwise caused by high frictional force in known strain gauge assemblies.

Another objective of the present invention is to provide a strain gauge assembly with means for compensating for the inherent forshortening of the flexible member between the points of application of force. Unlike known devices, this is achieved by making connection of support members and force transmitting members at fixed locations on the flexible member offset from the neutral plane and spaced from the surface of the elongate member. This reduces the amount of movement required by the movable support members and force transmitting members and thereby reduces the frictional force resisting movement of the flexible member. This thus further reduces non-linearity.

In a preferred embodiment, a strain gauge assembly is provided with a frame member, a flexible member having a pair of opposite surfaces substantially equidistant from a central neutral plane thereof, a first notch extending from one of the surfaces to within a preselected distance from the central plane and a second notch extending from the other of the surfaces to within another preselected distance from the central plane, a strain gauge mounted to one of the surfaces, a pair of support members mounted to the frame member and extending into the first notch to support the flexible member at the preselected distance from the central neutral plane, means for transmitting a load to the flexible member including a load receiving member in overlying relationship with the flexible member and a load transmitting member mounted to the load receiving member and extending into the second notch to transmit force received by the load receiving member to the flexible member at the other preselected distance from the central neutral plane. Preferably, the preselected distances are equal to one another.

It is also an objective of the present invention to provide a strain gauge sub-assembly comprising an elongate flexible member having a pair of surfaces equidistant from a central neutral plane thereof, a strain gauge mounted to at least one of the pair of surfaces, and a pair of notches in each of the pair of surfaces extending into the flexible member to a preselected distance from the netural plane.

Yet another object of the present invention is to provide a strain gauge assembly in which the flexible member and strain gauges are protectively enclosed by the foot member and load receiving member which interconnect to form a self-contained module. In keeping with this objective, in a preferred embodiment, a strain gauge assembly is provided that comprises a load receiving member having an open face opposite a main wall between a pair of spaced sidewalls, a foot member having an open face opposite a main wall between a pair of sidewalls, a flexible member with a strain gauge attached thereto and means connected with the main walls of the frame member and load receiving member for mounting the flexible member in force receiving relationship therebetween and protectively enclosed by both of said pairs of sidewalls. Preferably, additional pairs of sidewalls are provided which interconnect the first mentioned pair of sidewalls to form the load receiving members and frame members into rectangular boxes, one of which interfits within the other. In this fashion, the strain gauge, support and load transmitting members and flexible member are protectively surrounded by sidewalls. This construction also improves the rigidity of the load receiving member and the foot member.

It is also an object of the present invention to provide an electronic weight scale having a housing and display mounted to the housing for providing a visual indication of weight in which an improvement is provided comprising a plurality of self-contained load modules, each of which includes a strain gauge for sensing weight, an electronic adder connected with each of the strain gauges of the plurality of load modules for producing a total weight signal proportional to the total weight sensed by the strain gauges and means for connecting the average weight signal to the display to cause visual display of the average weight represented thereby. This approach overcomes the problems of weight distribution and averaging attempted by mechanical means in known devices.

Still another object of the present invention is to provide a strain gauge assembly which employs a flexible diaphragm and means for receiving and uniformly distributing a load to the diaphragm. This objective is achieved by provision of a weight scale having a housing in which the improvement is a combination of elements mounted to the housing, comprising, a load receiving member, a flexible member with a strain gauge attached thereto, a sealed, flexible, fluid container containing a fluid in pressure communication with the flexible member, means for increasing the pressure in the container to flex the flexible member in response to application of a load to the load receiving member, and means responsive to the strain gauge for providing an indication of weight.

Preferably, such a strain gauge assembly is provided with a lateral restraint member having a pair of opposite upper and lower open ends, a flexible diaphragm having a strain gauge attached to a surface thereof to provide an electrical indication of weight, means for mounting the diaphragm to the restraint member to close the upper end, a sealed flexible container of a fluid having a portion partially contained within the restraint member and in pressure communication with the flexible diaphragm at the upper end and another portion protruding from the lower open end to support the restraint member above a floor surface against the load and means spaced from the flexible diaphragm for applying a downwardly directed load to the restraint member, such load causing the flexible container to be pressed upward by the sealed flexible container to apply fluid pressure to the diaphragm in relation to the load.

Another object of present invention is to provide a weight scale comprising a plurality of self contained load modules having a strain gauge for sensing weight in response to loading of a flexible fluid container, means for electronically adding the weight sensed by the strain gage for producing a signal representative of the total weight and means for displaying a visual indication of the total weight in response to the signal.

BRIEF DESCRIPTION OF THE DRAWINGS

The foregoing objects, features and advantages will be described in greater detail, and further objects, features and advantages will be made apparent in the detailed description of the preferred embodiments which is given with reference to the several views of the drawing, in which.

DETAILED DESCRIPTION

Figure 1:
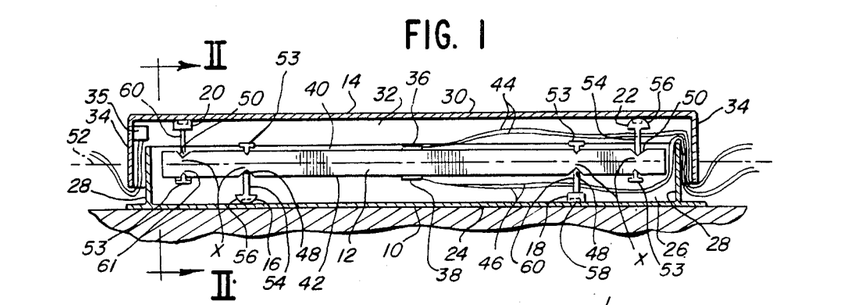
FIG. 1 is a cross sectional side view of a preferred embodiment of one form of the strain gauge assembly of the present invention.
Figure 2A:
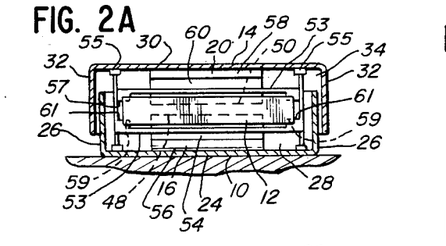
FIG. 2A is a sectional end view of the strain gauge assembly taken along section line II—II of FIG. 1.

Referring now to the drawings, particularly FIGS. 1 and 2A, the flexible member strain gauge assembly of the present invention is seen to include an underlying rigid, foot, or frame, member 10, an elongate flexible member 12, an elongate rigid force, or load, receiving member 14, a pair of underlying support members 16 and 18 and a pair of force transmitting members 20 and 22. The foot member 10 has a rectangular bottom plate 24 and two pairs of opposite sidewalls 26 and 28 surround its perimeter to form an open box. Similarly, the rigid force receiving member 14 has an upper force, or load, receiving rectangular plate 30 with two pairs of downwardly extending, opposite sidewalls 32 and 34 interconnected around the perimeter to form another open box. As seen, the box of force receiving member 14 is larger than the box of foot member 10 and fits over it so that the sidewalls 26, 28, 32 and 34 and rectangular plates 24 and 30 protectively envelop and surround the remaining portion of the strain gauge assembly. In addition to this protective feature, the box-like configuration of the foot member 10 and force receiving member 14 also advantageously increases their rigidity.

A pair of strain gauges 36 and 38 are respectively mounted to a pair of opposite surfaces 40 and 42 of flexible member 12. These semiconductor strain gauges 36 and 38 are located intermediate, preferably centrally, of support members 16 and 18 and have pairs of leads 44 and 46. These pairs of leads extend from the strain gauges within the protective enclosure formed by foot member 10 and force receiving member 14 to without the enclosure for connection with external circuitry. As is well known, when the semiconductor strain gauges 36 and 38 are compressed or tensed upon application of a load to the force receiving member which causes the flexible member to flex, they produce a resultant voltage which is related thereto. This voltage is produced across the pairs of leads 44 and 46 to develop a signal representative of the load applied to the strain gauge assembly.

In keeping with another important aspect of the present invention, the flexible member 12 has two pairs of notches 48 in underlying surface 42 and a pair of notches 50 in overlying surface 40. Both of these pairs of notches extend from their respective surfaces to a preselected distance X from a central neutral plane 52 extending through the center of the flexible member 12. The support members 16 and 18 and force transmitting members 20 and 22 have knife edges which extend into these notches and the forces applied thereby are thus applied to the flexible member 12 at this preselected distance X from the neutral plane 52.

Figures 3, 5B:
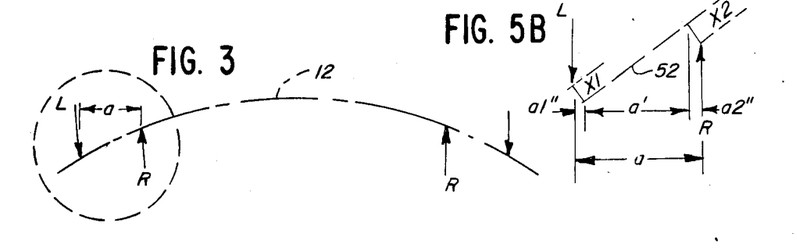
FIG. 3 is a schematic illustration of the flexing of a flexible member resulting from the application of forces to the neutral plane thereof.
FIGS. 5A and 5B are schematic illustrations of the flexible member of the strain gauge assembly of the present invention before and after flexing, respectively, and illustrating the manner in which the foreshortening problem is overcome.
Figure 4A:
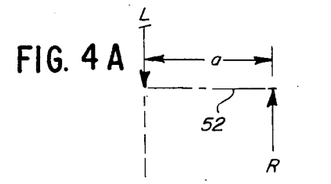
FIGS. 4A and 4B are schematic illustrations of the encircled area of FIG. 3 of prior to and after flexing, respectively, to illustrate the resultant apparent foreshortening of the flexible member which the present invention is designed to overcome.
Figure 4B:
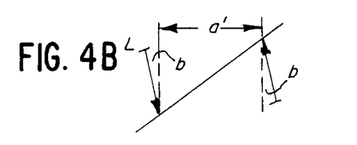

This advantageously alleviates the problems resulting from apparent foreshortening of the flexible member 12 when it is flexed as illustrated in FIGS. 3, 4A and 4B. Referring to FIG. 3, an elongate flexible member has notches similar to those shown in FIG. 1 but which extend to the neutral plane 12. Accordingly, the distance A between the point of application of the load force L by the transmitting member 20 or 18 and the point of application of the resultant force R by the support member 16 or 22, respectively, varies due to the flexing of neutral plane 12.

Referring to FIG. 4A, when the load force and resultant force is zero or a very small value such that there is no significant flexing, the distance between the points of application of the load force L and resultant force R is a certain preselected distance "a" measured in a lateral direction parallel to the elongate directions of foot member 10 and force receiving member 14. However, referring to FIG. 4B, after a sufficient load force L and resultant force R is developed to cause flexing of the neutral plane 12, the distance between the points of application of these forces to the neutral plane measured in the lateral direction is reduced to a distance "a'" which is less than distance "a".

Consequently, since the foot member 10 and force receiving member 14 are rigid and do not flex, to the extent that one of the support members and one of the force transmitting members does not laterally move to follow the lateral movement of the point of the notch the load force l and resultant force R is applied to the flexible member 12 in a direction which is offset by an angle b that is offset from the transverse direction to the force receiving member 14 and foot member 10. To the extent that one of the support member and associated force transmitting member and the associated support member is resisted by friction, flexing of the flexible member is restrained. Accordingly, as the load is increased and the flexible member 12 flexes more and more and friction increases, an increasing component of the load force is directed in a non-transverse direction which results in a non-linear relationship between the load force and degree of flexing. That is, the greater the flexible member 12 is flexed, the greater the amount of force is required for a further increment of flexure.

Figure 5A:
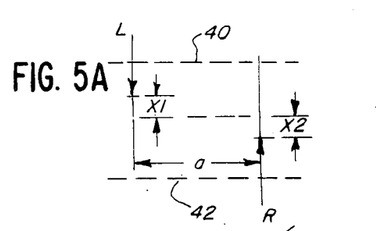

Referring to FIGS. 5A and 5B, in the present invention this problem is substantially alleviated by application of the load and resultant forces to the flexible member 12 at a preselected distances X1 and X2 offset from the neutral plane 52 as illustrated in FIG. 5A. As seen in FIG. 5B, this additional distance X from the neutral plane creates a corresponding additional distance a1" and a2" at opposite ends of the segment of the flexible member 12 between the point of application of the load force and the resultant force. When these are added to the foreshortened distance a' between points of application at the neutral plane maintenance of an overall distance "a" is achieved. Accordingly, the amount of movement of the movable support member and force transmitting member is reduced, and the friction associated with such movement, sliding or otherwise, is thereby eliminated. Preferably, distances X1 and X2 are equal to each other and thus distances a1" and a2" are equal.

Referring again to FIG. 1, another advantageous feature of the present invention is the provision of a movably mounted support member 16 and a movably mounted force transmitting member 22 which are mounted to their associated foot member 10 and force receiving member 14 for non-sliding movement therealong. Again, due to the apparent foreshortening of the flexible member when flexed, it is necessary that at least one of the support members or its associated force transmitting member be permitted to move laterally as the flexible member is flexed. While movement between members by sliding one laterally relative to the other would work in the present structure, it is not preferred. When heavy loads are applied, this sliding motion is resisted by high frictional forces which impede free movement and thus impede the proper and free flexing of the flexible member in response to the load. Thus, again as the load is increased, each additional increment of flexing requires a greater increment of force to overcome the frictional force.

This problem caused by high friction and the resultant non-linearity is preferably alleviated in accordance with the present invention by providing a support member 16 and a force transmitting member 22 which is designed to non-slideably move along the surface of its associated foot member 10 and force receiving member 14. Preferably, this non-sliding movement is a pivotal, rocking movement although a rolling movement is also contemplated. In particular, referring to FIG. 1, each of the movable support members 16 and force transmitting member 22 have an elongate knife edge member 54, the distal end of which extends into the associated notch. The distal end is supported above a base member 56 having an arcuate surface, preferably circular, to provide for rocking motion. Alternatively, the base is provided with underlying ball bearings or the like for rolling motion. The frictional force resisting the rocking or rolling motion is, of course, substantially less than the frictional force to overcome sliding movement, and thus linearity is substantially enhanced. The remaining support member 18 and force transmitting member 20 may have a base 58 fixedly attached to its associated foot member 10 or force receiving member 14 and a knife edge portion 60 extending into the associated notch.

Figure 2B:
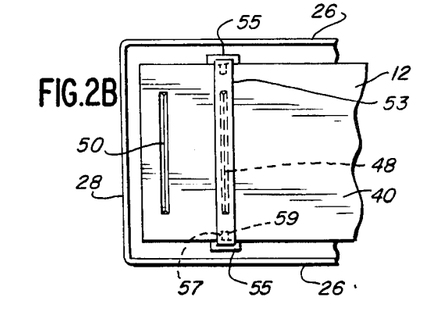
FIG. 2B is a plan view of a portion of the flexible member and foot member which more clearly illustrates the restraint member shown in FIG. 1.

Referring to FIGS. 1, 2A and 2B, four restraint members 53 are provided for holding together the assembly of the foot member 10, flexible member 12 and the load receiving member 14 in the absence of a load. These restraint members are in the form of resilient straps made of plastic or the like and are mounted directly over the associated notches 48 and 50. Two of them have their opposite ends 55 mounted to the opposite sides of the foot member and extend over the top surface 40 of the flexible member to hold the flexible member 12 against the support members 16 nd 18 in the absence of a load. Knife edges 57 fit into small grooves 59 in the top surface 40 at the opposite sides thereof to restrain the flexible member 12 and foot member 10 against relative lateral movement. The other pair of restraint members have their opposite ends 55 mounted to the opposite sides of the load receiving member and extend over the bottom surface 42 of the flexible member 12 against the load transmission members 20 and 22. Likewise, knife edges 61 fit into grooves at opposite sides of surface 42 to prevent relative movement.

Figure 6:
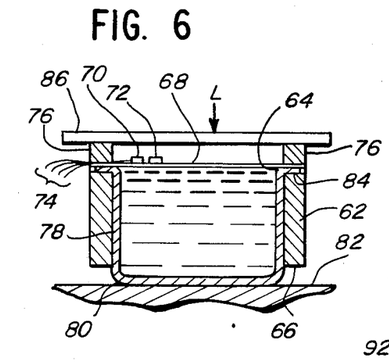
FIG. 6 is a cross sectional side view of another embodiment on a strain gauge assembly of the present invention which employs a flexible diaphragm instead of an elongate flexible member.
Figure 7A:
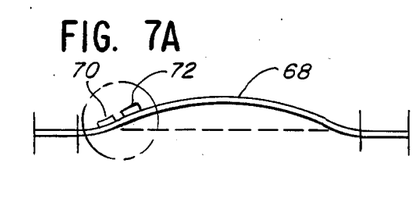
FIGS. 7A and 7B are schematic illustrations of the location of the strain gauges on the flexible diaphragm of the strain gauge assembly of FIG. 6 at tensive and compressive sections of the diaphragm.
Figures 7B, 9:
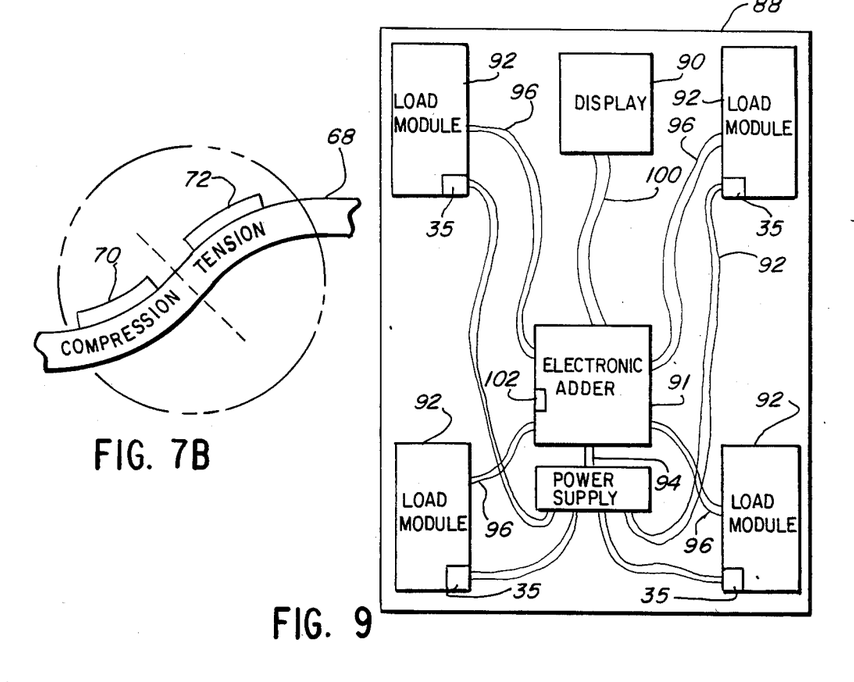
FIG. 9 is a schematic illustration of another form of the weight scale of the present invention employing the strain gauge assemblies, or load modules, of FIG. 1 or 6.

Referring now to FIGS. 6, 7A and 7B, another embodiment of a strain gauge assembly employing a flexible diaphragm instead of an elongate flexible member will be described. The strain gauge assembly of FIG. 6 comprises a hollow restraint member 62 having an upper open end 64 and an opposite lower open end 66. This restraint member is rigid and resists movement in a direction transverse to the direction between its open ends. A flexible diaphragm 68 has a pair of strain gauges 70 and 72 attached to an upper surface thereof to provide an electrical signal indicative of weight. Each of these strain gauges 70 and 72 have a pair of leads 74 for connection with external circuitry. The metal diaphragm 68 is mounted around its periphery to the hollow restraint member 62 by means of a member 76 which clamps it against the upper end of restraint member 62 to close the open end 64. A sealed flexible container 78 made of rubber, flexible plastic or the like contains a fluid, such as oil, which is in pressure communication with the underside of diaphragm 68.

Preferably, the flexible membrane 68 closes the open end of the flexible container 78 and the fluid is in direct pressure communication, as shown. Alternately, the flexible container has a sealed top and the fluid is in indirect pressure communication with the flexible membrane by pressing the upper portion of the flexible container surface against the membrane. The sealed flexible container 78 is substantially contained within the confines of the restraint member 62 which restrains it from lateral movement. However, it has a portion 80 which protrudes from the lower open end 66 to support the restraint member 62 above a floor surface 82 against a load L. A member 76 which extends around the periphery of restraint member 62 and clamps both the diaphragm 68 and a peripheral lip portion 84 of flexible container 78. This member 76 also functions to transmit a load force L to the restraint member 62 and thus to sealed flexible container 78 from a force receiving and distribution member 86.

When a load L is applied to force receiving and distribution member 86, the bottom surface of the protruding portion 80 of sealed flexible container 78 is pressed upwardly which is translated into an increase in fluid pressure that causes the diaphragm 68 to flex upwardly. Because the force on the diaphragm is applied by a fluid, the loading is uniformly distributed across the underlying surface of the diaphragm 68.

As seen in FIGS. 6, 7A and 7B, this causes the strain gauge 70 to be compressed and the strain gauge 72 to be placed in tension. These strain gauges 70 and 72 are interconnected in a suitable bridge network (not shown) for temperature compensation and to produce a suitable composite output signal representative of weight.

Figure 8:
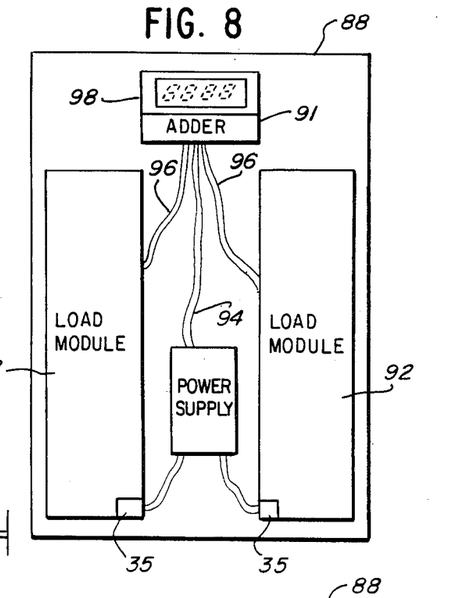
FIG. 8 is a schematic illustration of a weight scale employing the strain gauge assemblies, or load modules, of FIGS. 1 or 6.

Referring now to FIG. 8 and FIG. 9, two embodiments of a weight scale of the invention suitable for employment of the strain gauge assemblies of either FIGS. 1 and 2 or FIG. 6 is shown. As seen in FIG. 8, the weight scale has a housing 88 containing a display 90 for providing a visual indication of weight in response to signals from a suitable electronic adder circuit 91. The electronic adder circuit 91 produces an average weight signal representative of the average weight or load applied to a pair of substantially identical strain gauge assemblies or load modules 92. These load modules 92 preferably comprise the load modules or strain gauge assemblies shown in FIGS. 1 and 6 and described above, but self-contained load modules of other construction could be successfully employed. The housing also contains a DC power supply, such as a dry cell battery, which is connected to power the electronic adder 91 by means of leads 94. Each of the load modules are likewise connected to electronic adder 91 by means of leads 96. As seen in FIG. 8, the adder 91 and display 90 are contained in a common housing 98. In FIG. 9, the weight scale is substantially identical to that of FIG. 8, except that the adder 91 is separate from the display 90 and four substantially identical load modules 92 are employed instead of only two. Electronic adder is connected to the display, preferably a digital electronic display, by means of leads 100.

In both scales of 8 and 9, when employing a load module such as shown in FIG. 1 which contains a switch 34, the switch 34 is connected with the power supply 94 and interrupts application of power to the electronic adder except when a load exceeding a preselected minimum load, such as twenty pounds, is applied. With plural switches 34, the switches are connected in series, so that each load module requires a minimum load before the application of power to the electronic adder and display. An additional switch 102, associated with electronic adder 91, may be provided to adjust the adder for calibration purposes.

While particular and preferred embodiments of the invention have been disclosed, it should be appreciated that numerous variations may be made with respect thereto without departing from the scope of the invention as set forth in the following claims. For instance, although a particular arrangement of movable and nonmovable support members and force transmitting members has been shown, some of the advantages of the invention could be obtained with other combinations and permutations.

We claim:

1. In a weight scale having a housing and a display responsive to a strain gauge signal for visually indicating weight measured by the scale, an improved strain gauge assembly, comprising:
   a flexible member with a strain gauge attached thereto to provide an electrical signal in response to the flexing of the flexible member;
   a foot member in underlying relationship with the flexible member;
   a load receiving member in overlying relationship with the flexible member;
   a pair of support members connected with the foot member for supporting the flexible member at a pair of spaced locations associated therewith; and
   a pair of load transmitting members connected with the load receiving member for transmitting a load therefrom to the flexible member at two locations spaced from one another and from the pair of locations associated with the foot member, at least one of said support members and load transmitting members having one end pivotally connected to the flexible member to pivot at a fixed location thereof and another end connected to the associated one of the foot member and load receiving member for relative lateral movement with respect thereto.

2. The weight scale of claim 1 in which said movement is translational lateral movement.

3. The weight scale of claim 1 in which said relative movement is non-sliding movement.

4. The weight scale of claim 3 in which said relative movement is rocking movement.

5. The weight scale of claim 1 in which
   one of said support members is mounted for movement relative to the foot member, and
   one of the load transmitting members is mounted for movement relative to the load receiving member.

6. The weight scale of claim 5 in which one of said support members is fixedly attached to the foot member.

7. The weight scale of claim 5 in which one of said load receiving members is fixedly attached to the load receiving member.

8. The weight scale of claim 1 in which one of said support members and load receiving members has a relative narrow connection portion engageable with the flexible member at a fixed location thereof and a base portion connected to its associated foot or force receiving members for relative movement therealong.

9. The weight scale of claim 8 in which said base portion has an arcuate surface for rolling translational movement.

10. The weight scale of claim 9 in which said base portion is fixedly mounted to the connection portion and said rolling motion imparts a pivotal motion to said connection portion.

11. The weight scale of claim 8 in which said base portion has a rocker surface for rocking movement.

12. The weight scale of claim 8 in which one of said support members and one of said loading transmitting members have a base portion with a rocker for rocking movement thereof.

13. The weight scale of claim 10 including means connected with the load receiving member, flexible member and foot member for retaining them together in the absence of a load.

14. The weight scale of claim 13 in which said retaining means includes a plurality of straps for holding the flexible member to the foot member and the load receiving member, respectively, in the absence of a load.

15. The weight scale of claim 13 in which
   said flexible member has grooves in a surface thereof, and
   said retaining means includes a plurality of straps which fit into the grooves, respectively, to retain the flexible member, foot member and load receiving members against substantial relative lateral movement in the absence of a load.

16. The weight scale of claim 1 in combination with
   another improved strain gauge assembly substantially identical to said first mentioned strain gauge assembly contained with the housing,
   a circuit responsive to the strain gauge signals from both of the strain gauge assemblies for producing a weight signal representative of the total load applied thereto, and
   means for applying the weight signal to the display to provide an indication of the total weight.

17. In a weight scale having a housing and a display responsive to a strain gauge signal for visually indicating weight measured by the scale, an improved strain gauge assembly, comprising:
   a flexible member with a strain gauge attached thereto to provide an electrical signal in response to the flexing of the flexible member;
   a foot member in underlying relationship with the flexible member;
   a load receiving member in overlying relationship with the flexible member;
   a pair of support members connected with the foot member for supporting the flexible member at a pair of spaced locations associated therewith;
   a pair of load transmitting members connected with the load receiving member for transmitting a load therefrom to the flexible member at two locations spaced from one another and from the pair of locations associated with the foot member; and
   means connected with the load receiving member, flexible member and foot member for retaining them together in the absence of a load, said retaining means including a plurality of retaining members, one of said retaining members being attached to the load receiving member and engaging the flexible member adjacent one of the load transmitting members, and another of said retaining members being attached to the foot member and engaging the flexible member adjacent one of support members.

18. The weight scale of claim 17 including another retaining member attached to the load receiving member and engaging the flexible member for holding it thereto adjacent the other load transmitting member, and another retaining member attached to the foot member and engaging the flexible member for holding it thereto adjacent the other support member.

19. A strain gauge assembly, comprising a foot member;

a load receiving member;

a flexible member with a strain gauge attached thereto; and means for interconnecting the flexible member with the foot member and the load receiving member including a rigid interconnecting member movably mounted between the flexible member and at least one of the foot member and the load receiving member for lateral movement relative thereto, said interconnecting member having a relatively narrow end pivotally connected to the flexible member at a fixed connection point thereon at a preselected fixed distance from the strain gauge, and another end for laterally moving along the surface of the at least one of the foot member and the load receiving member to which it is connected in response to relative lateral movement of the fixed connection point during bending of the flexible member in response to application of a load.

20. The strain gauge assembly of claim 19 in which said interconnecting means includes another interconnecting member spaced from said movably mounted interconnecting member and in engagement with said elongate flexible member and said at least one of the foot member and the load receiving member to which is connected the movably mounted interconnecting member.

21. The strain gauge assembly of claim 20 in which said other interconnecting member is fixedly mounted to the one of said foot member and load receiving member to which is connected said movably mounted interconnecting member.

22. The strain gauge assembly of claim 19 in which said movably mounted interconnecting member is mounted to the foot member for rocking movement relative thereto.

23. The strain gauge of claim 19 in which said movably mounted interconnecting member is mounted to said load receiving member for rolling movement relative thereto.

24. The strain gauge of claim 19 in which said flexible member has a slot at said fixed connection point for receipt of said relatively narrow end of the movably mounted interconnecting member.

25. The strain gauge assembly of claim 24 in which said other end of the interconnecting member has an arcuate surface for rolling lateral movement.

26. The strain gauge assembly of claim 19 in which said interconnecting member is a vertical load transmitting member which interconnects the load receiving member and the flexible member to transmit a load to said elongate flexible member from the load receiving member.

27. The strain gauge assembly of claim 26 including another vertical load transmitting member which is fixedly mounted to one of said load receiving member and said flexible member and spaced from said movably mounted load transmitting member by a preselected amount greater than said preselected distance.

28. The strain gauge assembly of claim 27 including another vertical support member which is fixedly mounted to one of said foot member and the flexible member and spaced from said movably mounted support member by a preselected amount greater than said preselected distance.

29. The strain gauge assembly of claim 25 including another load transmitting member spaced from said movably mounted load transmitting member by another preselected amount less than said preselected amount.

30. The strain gauge assembly of claim 29 in which said support members are located between said load transmitting members.

31. The strain gauge assembly of claim 30 in which the movably mounted support member is mounted adjacent said fixedly mounted load transmitting member.

32. The strain gauge assembly of claim 26 in which said movably mounted load transmitting member is mounted to the foot member for rocking movement relative thereto.

33. The strain gauge assembly of claim 25 including another movably mounted load transmitting member interconnecting the load receiving member and the flexible member and mounted to the load receiving member for non-sliding movement relative thereto.

34. The strain gauge assembly of claim 33 in which said movably mounted load transmitting member is mounted to the load receiving member for rocking movement relative thereto.

35. The strain gauge assembly of claim 33 in which movably mounted load transmitting member is mounted to the flexible member for pivotal movement relative thereto.

36. The strain gauge assembly of claim 35 in which said movably mounted load transmitting member is mounted to the load receiving member for rocking movement relative thereto.

37. The strain gauge assembly of claim 33 in which said flexible member has a central plane extending therethrough and all of said support members and said load transmitting members are mounted to slots of said flexible member which extend to a location spaced from said plane.

38. The strain gauge of claim 19 in which said interconnecting member is a support member which interconnects the flexible member and the foot member and supports the flexible member against a vertical load above the foot member.

39. The strain gauge assembly of claim 19 in which said flexible member has a central plane and said movably mounted interconnecting member is engaged therewith at a location spaced from said plane.

40. The strain gauge assembly of claim 39 in which said flexible member has a notch extending therein to a preselected distance from said central plane and said interconnecting member is received within said notch.

41. The strain gauge assembly of claim 19 including a second strain gauge attached to said flexible member opposite said first mentioned strain gauge.

42. The strain gauge assembly of claim 19 in combination with a meter for producing an indication of the amount of strain imposed on said strain gauge.

43. A strain gauge assembly, comprising:
a foot member;
a flexible member overlying said foot member having
a pair of opposite horizontal upper and lower surfaces substantially equidistant from a central horizontal neutral plane thereof,
a first notch extending upwardly away from said foot member into the lower one of said surfaces to within a non-zero preselected distance from said central plane, and
a second notch extending downwardly toward said foot member into the other of said surfaces to within another non-zero preselected distance from said central plane;
a strain gauge mounted to one of said horizontal surfaces;
a support member underlying the flexible member and mounted to said foot member and extending into said first notch to support said flexible member at said one non-zero preselected distance from the central neutral plane intermediate the lower one of said surfaces and the central plane; and
means directly unidirectionally transmitting a vertically directed load to said flexible member including
a force receiving member in overlying relationship with said flexible member and said foot member, and
a force transmitting member mounted to said force receiving member and extending downwardly into said second notch to transmit vertical force received by the force receiving member directly to the flexible member at said other non-zero preselected distance from the central neutral plane intermediate the upper one of said surfaces and the central plane.

44. The strain gauge assembly of claim 43 in which said flexible member has
a third notch extending upwardly into the lower one of said horizontal surfaces to within said one preselected non-zero distance from said central plane, and
a fourth notch extending downwardly into the upper one of said upper surface to within said other preselected non-zero distance from the central neutral plane, and including
a second support member mounted to said foot member and extending upwardly into said third notch to support the flexible member at said one preselected non-zero distance from the central neutral plane, and in which
said load transmitting means includes a second force transmitting member mounted to an under surface of said force receiving member and extending downwardly into said fourth notch to directly transmit downward force received by the force receiving member to the flexible member at said other preselected non-zero distance from the central plane.

45. The strain gauge assembly of claim 44 in which the second and fourth notches are spaced from one another by a first preselected distance,
said first and third notches are separated from one another by a second preselected distance which is less than said first preselected distance, and
said one and the other preselected distances from the central plane are equal to each other.

46. The strain gauge assembly of claim 45 in which the first and second notches are separated from one another by a third preselected distance and the third and fourth notches are separated from one another by a fourth preselected distance which is substantially equal to said third preselected distance.

47. The strain gauge assembly of claim 46 in which the strain gauge is mounted to the one horizontal surface between the first and third notches.

48. The strain gauge assembly of claim 47 including a second strain gauge mounted to the other of said horizontal surfaces opposite said first mentioned strain gauge.

49. In a weight scale having a housing, a power supply and a weight indicator responsive to a strain gauge, the improvement being a self-contained strain gauge module mounted within the housing, comprising:
an elongate force receiving member having an open face opposite a main horizontal wall between a pair of spaced, downwardly extending sidewalls;
an elongate frame member having an open face opposite a main horizontal wall between a pair of upwardly extending sidewalls;
an elongate flexible member with a strain gauge attached to a horizontal surface thereof for measuring flexing in a vertical plane; and
means connected with the main walls of the frame member and force receiving member for mounting the flexible member in force receiving relationship therebetween and for protection thereof by both of said pairs of sidewalls, said sidewalls overlapping to protectively contain the flexible member therebetween in adjacent parallel relationship therewith when mounted in force receiving relationship between the main walls, said mounting means including
a pair of spaced, rigid support members connected between the frame member for supporting the flexible member sufficiently above the main wall of the frame at a pair of spaced locations to enable downward flexing when weight is applied to the main wall of the force receiving member,
a pair of spaced, rigid force transmitting members connected between the flexible member and the frame receiving member for supporting the force receiving member above the main wall of the force receiving member at two spaced locations to directly transmit a vertical weight load from the main wall of the force receiving member to the flexible member at said two locations to cause flexing of the flexible member.

50. The strain gauge assembly of claim 49 in which the pair of sidewalls of one of said frame member and the force receiving member is slideably received between the pair of sidewalls of the other of said frame member and the force receiving member.

51. The strain gauge assembly of claim 49 in which the elongate sidewalls of the frame member are between and adjacent the elongate sidewalls of the force receiving member and adjacent elongate sidewalls of the flexible member.

52. The strain gauge assembly of claim 49 in which each of said frame member and force receiving member have a second pair of sidewalls at the end thereof which interconnect and extend in a direction transverse to the elongate sidewalls.

53. The strain gauge assembly of claim 49 including a switch connected with the strain gauge and mounted to one of said frame member and force receiving member and protectively enclosed therebetween.

54. The strain gauge assembly of claim 53 in which said switch is actuated by relative vertical movement between the frame member and the force receiving member.

55. A strain gauge sub-assembly, comprising:
an elongate, flexible rectangular member having a relatively wider pair of surfaces equidistant from a central neutral plane thereof and a relatively narrower pair of surfaces interconnecting the relatively wider surfaces;
a strain gauge mounted to one of said pair of relatively wider surfaces, and
a pair of notches in each of said pair of relatively wider surfaces extending into the flexible member to a non-zero preselected distance from the central neutral plane.

56. The strain gauge sub-assembly of claim 55 in which said notches have a substantially V-shaped cross section.

57. The strain gauge sub-assembly of claim 55 in which the distance between the pair of notches of one of said pair of surfaces is greater than the distance between the notches of the other of said pair of surfaces.

58. The strain gauge sub-assembly of claim 55 in which said pairs of notches are symmetrically located with respect to the elongate center of the flexible member.

59. The strain gauge assembly of claim 55 in which all of said preselected distances are equal to each other.

60. The strain gauge sub-assembly of claim 55 including another strain gauge mounted to the other of said relatively wider pair of surfaces opposite the first mentioned strain gauge.

61. In an electric weight scale having a housing and a display mounted to the housing for providing a visual indication of weight, the improvement comprising:
a plurality of separate self contained load modules contained within the housing and each of which includes a strain gauge for sensing weight, each of said modules including its own switch actuated only in response to receipt of a weight thereby to enable provision of a visual indication of weight,
an electric adder connected with each of the strain gauges of said plurality of load modules for producing a total weight signal proportional to the total weight sensed by the strain gauges; and
means for connecting the total weight signal to the display to cause visual display of the total weight represented thereby.

62. In an electric weight scale having a housing and a display mounted to the housing for providing a visual indication of weight, the improvement comprising:
a plurality of separate self contained load modules contained within the housing and each of which includes a strain gauge for sensing weight, said plurality of load modules including two load modules located alongside one another and spaced a distance from one another by a distance substantially equal to the distance between a person's feet when standing normally, each one of said two load modules providing a weight signal in response to the force applied thereto by one foot independently of the force applied by the other foot to the other module,
an electric adder connected with each of the strain gauges of said plurality of load modules for producing a total weight signal proportional to the total weight sensed by the strain gauges; and
means for connecting the total weight signal to the display to cause visual display of the total weight represented thereby.

* * * * *